(12) United States Patent
Descude et al.

(10) Patent No.: US 12,393,202 B2
(45) Date of Patent: Aug. 19, 2025

(54) METHOD AND DEVICE FOR AUTOMATICALLY GUIDING AN AUTONOMOUS AIRCRAFT

(71) Applicant: THALES, Courbevoie (FR)

(72) Inventors: Sébastien Descude, Toulouse (FR); Christian Sannino, Toulouse (FR); Hugo Boronat, Toulouse (FR)

(73) Assignee: THALES, Courbevoie (FR)

( * ) Notice: Subject to any disclaimer, the term of this patent is extended or adjusted under 35 U.S.C. 154(b) by 98 days.

(21) Appl. No.: 18/275,489

(22) PCT Filed: Feb. 2, 2022

(86) PCT No.: PCT/EP2022/052395
§ 371 (c)(1),
(2) Date: Aug. 2, 2023

(87) PCT Pub. No.: WO2022/167441
PCT Pub. Date: Aug. 11, 2022

(65) Prior Publication Data
US 2024/0118706 A1   Apr. 11, 2024

(30) Foreign Application Priority Data
Feb. 5, 2021   (FR) ..................... 2101143

(51) Int. Cl.
*G05D 1/229*   (2024.01)
*B64U 10/25*   (2023.01)
(Continued)

(52) U.S. Cl.
CPC ............. *G05D 1/2295* (2024.01); *G05D 1/46* (2024.01); *G05D 1/689* (2024.01); *B64U 10/25* (2023.01);
(Continued)

(58) Field of Classification Search
CPC ........ G05D 1/2295; G05D 1/689; G05D 1/46; G05D 2109/254; G05D 2101/15;
(Continued)

(56) References Cited

U.S. PATENT DOCUMENTS

2009/0157233 A1   6/2009   Kokkeby et al.
2019/0011934 A1*  1/2019   DeBitetto ............ G01C 21/005

FOREIGN PATENT DOCUMENTS

EP   2 403 757 B2   4/2014

* cited by examiner

*Primary Examiner* — Michael D Lang
(74) *Attorney, Agent, or Firm* — BakerHostetler (57) ABSTRACT

A method for guiding an autonomous aircraft, the aircraft includes an automatic pilot, a plurality of sensors and an imaging unit, the aircraft being configured to fly over a geographic zone comprising overflight prohibited zones, the guidance method can advantageously comprise a phase of real flight of the autonomous aircraft by using a given guidance law, comprising the following steps: determining a current state of the autonomous aircraft; determining an optimum action to be executed by using a neural network receiving the current state; determining a plurality of control instructions compatible with the guidance law based on the optimum action to be executed; transmitting to the automatic pilot the plurality of control instructions, which provides a new state of the autonomous aircraft.

11 Claims, 4 Drawing Sheets

(51) Int. Cl.
*B64U 101/31* (2023.01)
*G05D 1/46* (2024.01)
*G05D 1/689* (2024.01)
*G05D 101/15* (2024.01)
*G05D 105/85* (2024.01)
*G05D 109/22* (2024.01)
*G05D 109/25* (2024.01)

(52) U.S. Cl.
CPC ...... *B64U 2101/31* (2023.01); *B64U 2201/10* (2023.01); *G05D 2101/15* (2024.01); *G05D 2105/85* (2024.01); *G05D 2109/22* (2024.01); *G05D 2109/254* (2024.01)

(58) Field of Classification Search
CPC ........... G05D 2109/22; G05D 2105/85; B64U 2201/10; B64U 2101/31; B64U 10/25
See application file for complete search history.

| X | X | X | V | O | Δ |
|---|---|---|---|---|---|
| X | O | O | O | O | X |
| O | O | V | X | X | X |
| X | X | X | X | X | X |

METHOD AND DEVICE FOR AUTOMATICALLY GUIDING AN AUTONOMOUS AIRCRAFT

CROSS-REFERENCE TO RELATED APPLICATIONS

This application is a National Stage of International patent application PCT/EP2022/052395, filed on Feb. 2, 2022, which claims priority to foreign French patent application No. FR 2101143, filed on Feb. 5, 2021, the disclosures of which are incorporated by reference in their entireties.

FIELD OF THE INVENTION

The invention relates generally to aircraft, and in particular a method and a device for automatically guiding an autonomous aircraft.

In the field of object surveillance, it is known practice to use airborne surveillance systems using an aircraft equipped with an imaging unit to surveille objects of interest by taking aerial exposures. The aircraft can be for example an aircraft of multi-rotor drone type. The imaging unit can be orientable to photograph objects of interest which may be located in overflight prohibited zones. The aircraft and the imaging unit must be positioned according to a precise angle in order to be able to photograph a given object of interest. However, such solutions incur significant deployment costs and high energy consumption. Moreover, the vibrations which are provoked by the motors of the multi-rotor drone and to which the imaging unit is subjected are high. Such drawbacks considerably shorten the flight time of the drone and significantly degrade the quality of the images acquired.

BACKGROUND

Other solutions have been proposed to ensure the automatic guidance of an autonomous aircraft. Generally, the overflight zone considered is not in as much as there are no zones prohibited to aircraft overflight. The existing guidance devices apply guidance laws relying on problems of optimization to determine the shortest path which makes it possible to pass by a given number of previously identified objects of interest. However, such guidance laws do not make it possible to anticipate the heading taken by the aircraft to be situated within the field of the object of interest to be photographed. A solution of this type is described for example in the patent EP2403757 "Unmanned air vehicle (UAV), control system and method". However, it does not make it possible to anticipate the heading taken toward an object of interest.

There is thus a need for an enhanced guidance method and device intended for autonomous aircraft.

SUMMARY OF THE INVENTION

To this end, the present invention provides a method for guiding an autonomous aircraft, the aircraft comprising an automatic pilot, a plurality of sensors and an imaging unit, the aircraft being configured to fly over a geographic zone comprising overflight prohibited zones and a safe corridor that does not pass through the overflight prohibited zones, the imaging unit being able to photograph one or more object of interest located in the geographic zone. Advantageously, the guidance method comprises a phase of real flight of the autonomous aircraft between a position of departure and a predefined position of arrival that are associated with the safe corridor, by using a given guidance law, the guidance method comprising the following steps, implemented at a given instant of the real flight phase:

determining a current state of the autonomous aircraft as a function of a plurality of input parameters comprising input parameters supplied by the plurality of sensors;

determining an optimum action to be executed by using a neural network receiving the current state;

determining a plurality of control instructions compatible with the guidance law based on the optimum action to be executed;

transmitting to the automatic pilot the plurality of control instructions, which provides a new state of the autonomous aircraft.

The method further comprises a preliminary learning phase consisting in optimizing the neural network based on a plurality of fictitious flights of the aircraft, each of the fictitious flights comprising a succession of fictitious steps.

In one embodiment, the guidance method can further comprise an additional step consisting in transmitting to the imaging unit photographic exposure instructions, if the new state makes it possible to photograph at least one object of interest.

In another embodiment, the neural network can represent a value function, the value function associating with each current state of the autonomous aircraft one or more actions, each of the actions being associated with an action value representative of an expected sum of reward parameters, the optimum action to be executed being associated with a maximum action value.

Alternatively, the neural network can represent a strategy associating with each current state of the autonomous aircraft an optimum action to be executed.

Advantageously, the optimization of the neural network based on the plurality of fictitious flights can be determined by using a reinforcement machine learning algorithm.

As a variant, the neural network can comprise an input layer formed by a plurality of input neurons, at least one of the input neurons receiving information supplied by one of the sensors.

Optionally, each of the fictitious flights can be associated with a complexity parameter, the fictitious flights being used in the preliminary learning phase according to an ascending order of the complexity parameters.

In one embodiment, the reward parameters can be maximal if the new state corresponds to:
  a state indicating that the autonomous aircraft remains in the safe corridor;
  a state indicating that the imaging unit photographs at least one object of interest;
  a state in which the autonomous aircraft reaches a predefined position of arrival, and can be maximal if the new state corresponds to the state indicating an exit of the autonomous aircraft from the safe corridor.

In another embodiment, the guidance law can be a law from among:
  a heading capture and holding law, by action on the control surfaces of the ailerons of the autonomous aircraft;
  a route capture and holding law by action on the control surfaces of the ailerons of the autonomous aircraft;
  an altitude capture and holding law by action on the thrust of the engine or on the elevators of the autonomous aircraft;
  a speed capture and holding law by action on the thrust of the engine of the autonomous aircraft.

Also proposed is a guidance device implemented in an autonomous aircraft, the aircraft comprising an automatic pilot, a plurality of sensors and an imaging unit, the aircraft being configured to fly over a geographic zone comprising overflight prohibited zones and a safe corridor that does not pass through the overflight prohibited zones, the imaging unit being able to photograph one or more objects of interest located in the geographic zone. Advantageously, the guidance device comprises:
- a first unit capable of determining a current state of the autonomous aircraft as a function of a plurality of input parameters comprising input parameters supplied by the plurality of sensors;
- a second unit capable of determining an optimum action to be executed by using a neural network receiving the current state;
- a third unit capable of determining a plurality of control instructions compatible with the guidance law based on the optimum action to be executed;
- a fourth unit capable of transmitting to the automatic pilot a plurality of control instructions, which provides a new state of the autonomous aircraft, the guidance device being further configured to implement a preliminary learning phase to optimize the neural network based on a plurality of fictitious flights of the aircraft, each of the fictitious flights comprising a succession of fictitious steps.

In one embodiment, the guidance device can further comprise a fifth unit capable of transmitting to the imaging unit photographic exposure instructions.

Also a subject of the invention is an autonomous aircraft comprising the guidance device previously described.

BRIEF DESCRIPTION OF THE DRAWINGS

Other features and advantages of the invention will become apparent from the following description and figures, in which.

DETAILED DESCRIPTION

Figure 1:
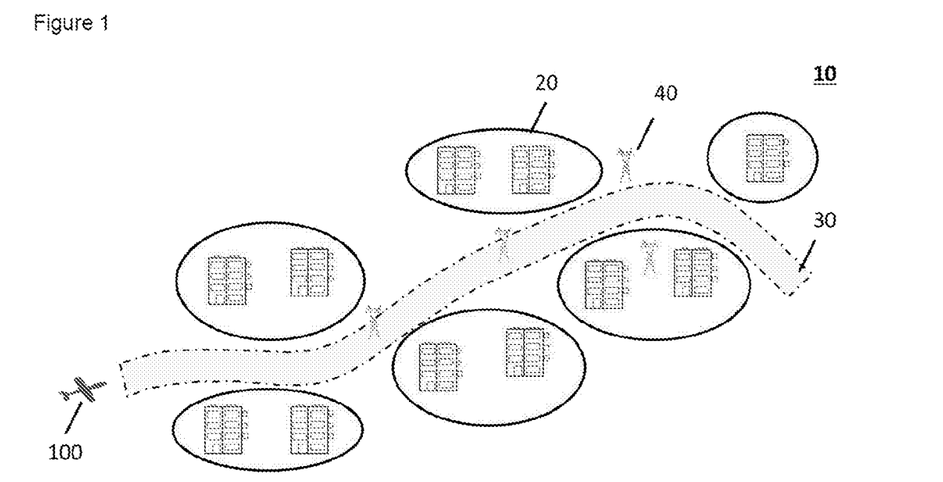
FIG. 1 represents a surveillance system, according to an embodiment of the invention.

FIG. 1 represents a surveillance system 10 comprising an autonomous aircraft 100 equipped with an imaging unit 101 according to embodiments of the invention. The surveillance system 10 can be configured to surveille a geographic zone comprising one or more objects of interest 40 to be photographed.

The geographic zone can comprise one or more overflight prohibited zones 20 in which an overflight of the autonomous aircraft 100 is prohibited. An overflight prohibited zone 20 can be, for example and in a nonlimiting manner, a residential zone, an industrial zone or an airport. Each overflight prohibited zone 20 can be associated with a three dimensional (3D) geometry and with 3D coordinates defined with respect to a given measurement reference frame. The 3D geometry can for example be a polyhedron, a cylinder, or any other 3D form.

The geographic zone can further comprise one or more safe corridors 30 defining subzones that the autonomous aircraft 100 is authorized to fly over. A safe corridor 30 can be configured so as not to pass through the overflight prohibited zones 20. A safe corridor 30 can for example, and in a nonlimiting manner, correspond to a road, to a river or to a beach. A safe corridor 30 can be configured so as to define a path between a position of departure and a position of arrival. Thus, the autonomous aircraft 100 can reach the position of arrival while remaining in the safe corridor 30.

The geographic zone can further comprise one or more objects of interest 40 that can be photographed by the imaging unit 101 with which the autonomous aircraft 100 is equipped. An object of interest 40 can be part of an overflight prohibited zone 20 or lie within the safe corridor 30, for example. The objects of interest 40 can be any type of object such as, for example, pylons, trees or vehicles. An object of interest 40 can be modeled by a 3D geometry associated with 3D coordinates defined with respect to a given measurement reference frame. Furthermore, a marking identifying the type of the object of interest 40 can be associated with each object of interest 40 to be photographed.

The autonomous aircraft 100 can for example be a fixed-wing drone or a multi-rotor drone. Fixed-wing drones exhibit less vibration and reduced energy consumption with respect to multi-rotor drones. The person skilled in the art will nevertheless understand that the invention is not limited to fixed-wing drones.

Figure 2:
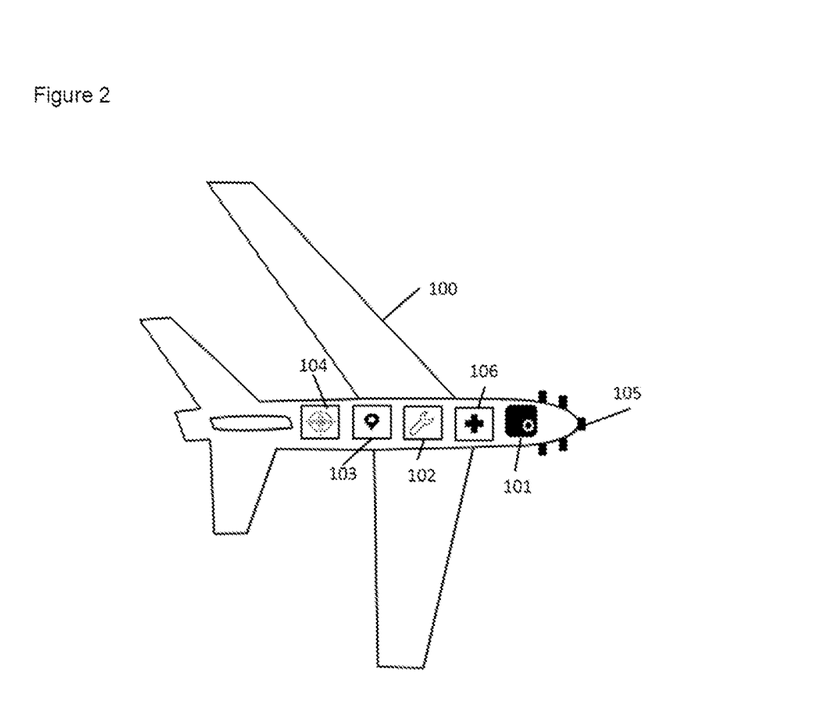
FIG. 2 represents a fixed-wing autonomous aircraft, according to an embodiment of the invention.

FIG. 2 represents a fixed-wing autonomous aircraft 100 according to an embodiment of the invention. The autonomous aircraft 100 can comprise a location unit 103 capable of determining the location of the autonomous aircraft in a given measurement reference frame by returning the three-dimensional coordinates of the aircraft, the location unit 103 being able for example to be of GPS (global positioning system) type. The autonomous aircraft 100 can comprise an inertial unit 104 configured to determine the attitude (roll, pitch and heading angles) of the autonomous aircraft 100 in the given measurement reference frame. The autonomous aircraft 100 can further comprise a speed sensor and an orientation sensor (not represented in FIG. 2) configured respectively to determine the instantaneous speed and the orientation of the autonomous aircraft 100 in the given measurement reference frame.

Advantageously, the autonomous aircraft 100 can further comprise one or more position sensors 105 arranged on its outer surface at different locations, each position sensor 105 being configured to detect obstacles likely to provoke a collision involving the autonomous aircraft 100 and to determine the distance separating the autonomous aircraft 100 from each detected obstacle. The position sensors 105 can further be configured to identify the nature of the detected obstacles. In one embodiment, the position sensors 105 can for example be arranged uniformly and symmetrically around the nose of the autonomous aircraft. The number of position sensors 105 can for example be odd by positioning one of them on the longitudinal axis of the autonomous aircraft. Furthermore, the position sensors 105 can be configured to return a negative value, for example −1, in the case of non-detection of obstacles.

The autonomous aircraft 100 can further comprise a sensor of objects of interest 40 (not represented in FIG. 2) configured to detect objects of interest 40 and to determine the relative position of each detected object of interest 40 with respect to the instantaneous position of the autonomous aircraft 100. Such a relative position can be represented by an angle and a distance separating the autonomous aircraft 100 from the detected object of interest 40. Alternatively, the coordinates in a given measurement reference frame of the objects of interest 40 can be backed up beforehand by the sensor of objects of interest 40. In this case, the sensor of objects of interest 40 can be configured to determine the relative position of each object of interest 40 based on the coordinates of the objects of interest 40 and on the instantaneous position of the autonomous aircraft 100 as supplied by the location unit 103 described above.

The autonomous aircraft 100 can further comprise an automatic pilot 102 configured to execute a guidance law and to implement control instructions received, according to the guidance law executed, by actuation on elements of the autonomous aircraft 100 such as its engine and its control surfaces which act respectively on the speed and on the attitude of the autonomous aircraft 100.

The autonomous aircraft 100 can also comprise an imaging unit 101 which can be fixed rigidly to the aircraft. The imaging unit 101 can be associated with a set of opto-geometric parameters such as the focal distance, the field angle and the orientation which can be set over time. In this case, the imaging unit 101 can be oriented toward the front, on the longitudinal axis of the autonomous aircraft 100. Alternatively, one or more opto-geometric parameters of the imaging unit 101 can be adjusted over time. For example, the orientation and the focal distance of the imaging unit 101 can be adjusted over time. Moreover, the imaging unit 101 can be configured to receive exposure instructions intended to activate the photographic exposure of an object of interest 40 located in its field of view. The photographic exposure instructions can comprise, for an imaging unit 101 with adjustable opto-geometric parameters, the values of such adjustable parameters.

The autonomous aircraft 100 can further comprise a storage unit (not represented in FIG. 2) configured to back up permanently, that is to say in a nonvolatile manner, data of geographic nature linked to the position and to the geographic form of the elements comprising the overflight prohibited zones 20, the safe corridor 30 and/or the objects of interest 40 to be photographed.

Advantageously, the autonomous aircraft 100 can further comprise a guidance device 106 configured to communicate with elements of the autonomous aircraft 100 comprising the automatic pilot 102, the storage unit, the imaging unit 101 and the sensors with which the autonomous aircraft 100 is equipped (location unit 103, inertial unit 104, speed sensor, orientation sensor, position sensors 105, sensor of objects of interest 40, etc.). The guidance device 106 can be configured to determine, at a given instant during the flight of the autonomous aircraft 100, a current state of the autonomous aircraft 100 which can be described in relation to the external elements comprising the safe corridor 30, the overflight prohibited zones 20, the obstacles likely to provoke collisions, the objects of interest 40 to be photographed, etc. Such external elements form the environment 200 of the autonomous aircraft 100. Advantageously, the guidance device 106 can further be configured to govern the interaction between the autonomous aircraft 100 and its environment 200 by acting on the behavior (attitude and speed) of the autonomous aircraft 100.

Figure 3:
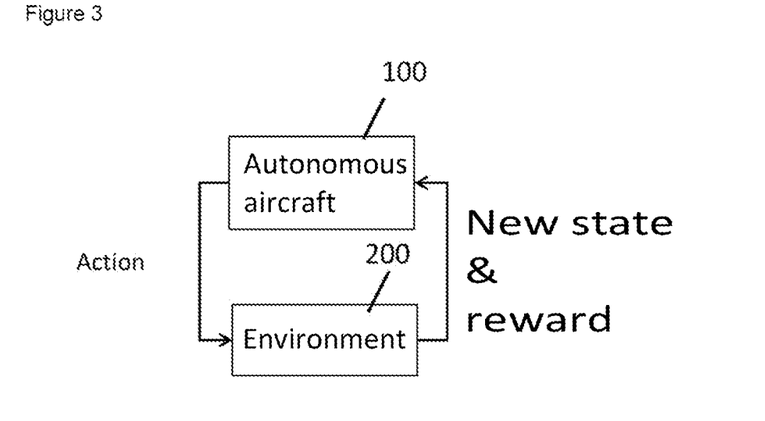
FIG. 3 illustrates the interaction between the autonomous aircraft and its environment, according to an embodiment of the invention.

FIG. 3 illustrates the interaction between the autonomous aircraft 100 and its environment 200 as governed by the guidance device 106, according to an embodiment of the invention. In this case, the guidance device 106 can further be configured to determine, at a given instant during the flight of the autonomous aircraft 100, an action to be executed from among a set of possible actions, the action to be executed being able to be arbitrary or dependent on the current state of the autonomous aircraft 100. Such an action to be executed can for example consist in changing the heading of the autonomous aircraft 100 by 10 degrees and/or increasing the speed by 30%. Such a change in the behavior (attitude and speed) can be perceived by the different sensors with which the autonomous aircraft 100 is equipped which allow the guidance device 106 to determine a new state of the autonomous aircraft in its environment, as well as an associated reward, also called reward parameter. The reward can for example have real values, a negative reward being representative of a "penalty". For example, the reward can be equal to 0.5 or to −0.5 depending on whether the new state corresponds to an aircraft remaining in the safe corridor 30 or corresponds to an aircraft exiting from the safe corridor 30. In another example, the reward can be equal to 1 if the new state allows the autonomous aircraft 100 to photograph an object of interest 40 by remaining in the safe corridor 30 and can be equal to 2 if the new state allows the autonomous aircraft 100 to reach the position of arrival by remaining in the safe corridor 30. The action executed by the autonomous aircraft 100 can for example be qualified as "optimal" if it corresponds to a maximum reward. The interaction between the autonomous aircraft 100 and its environment 200 as governed by the guidance device 106 can be iterative in which each iteration is representative of a step of the flight of the autonomous aircraft 100. The flight of the autonomous aircraft 100 can therefore be likened to an episode corresponding to a series of steps in which each step is represented by a state, an action and a reward.

Figure 4:
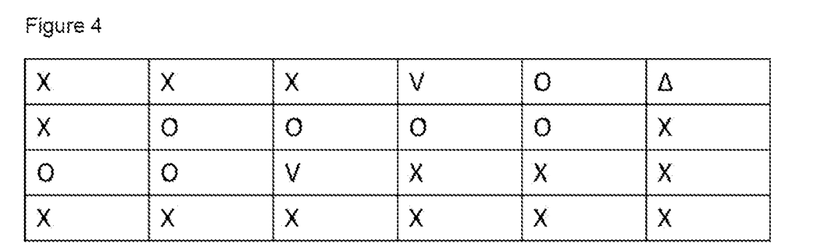
FIG. 4 illustrates an example of environments in which the autonomous aircraft can move around, according to an embodiment of the invention.

FIG. 4 illustrates, as a simple example, a representation of the environment 200 in which the autonomous aircraft 100 can move around. The columns of the matrix of FIG. 4 represent steps of an episode, that is to say of a flight of the autonomous aircraft 100 between a position of departure and a position of arrival. The cells of the matrix of FIG. 4 represent the states in which the autonomous aircraft 100 may be. In the interests of simplification, only four states are considered in the example of FIG. 4 and comprise:

- a first state corresponding to an autonomous aircraft outside of the safe corridor 30, the first state being schematically represented by the multiplication sign "X" and associated with a reward equal to −0.5, for example;
- a second state corresponding to an autonomous aircraft 100 inside the safe corridor 30, the second state being schematically represented by a circle "0" and associated with a reward equal to 0.5, for example;
- a third state corresponding to an autonomous aircraft 100 inside the safe corridor 30 and photographing an object of interest 40, the third state being schematically represented by the letter "V" and associated with a reward equal to 0.5, for example;

a fourth state corresponding to an autonomous aircraft 100 reaching the position of arrival, the fourth state being schematically represented by a triangle and associated with a reward equal to 2, for example.

In the simplified example of FIG. 4, the autonomous aircraft 100 can have a set of three possible actions available consisting in moving to the left, to the right, or forward.

In embodiments of the invention, the guidance device 106 of the autonomous aircraft 100 can be configured to determine an optimum strategy, also called optimum policy, that makes it possible to choose, in relation to each current state of the autonomous aircraft 100, an optimum action to be executed.

Advantageously, the determination of the optimum strategy can be performed during a learning phase prior to the real flight phase of the autonomous aircraft 100. The learning phase can be performed by using fictitious flights of the autonomous aircraft performed in environments 200 that are also fictitious and may not be identical to the real environment 200 in which the autonomous aircraft will be moving around, each fictitious environment 200 being representative of a scenario.

In embodiments of the invention, the strategy can be represented by an action-state value function, denoted Q[s, a], which determines the potential gain, also called the action value, that is to say the weighted sum of the rewards of each future step from the current step, provided by the fact of performing a certain action in a certain state s. When the value function Q[s, a] is learned, that is to say optimized, by the guidance device 106 of the autonomous aircraft 100, the optimum strategy can be obtained by selecting the action with maximum value for each state, that is to say by selecting the action a which maximizes the value Q[s, a] when the autonomous aircraft 100 is in the state s. Furthermore, the action-state value function can be represented by a table, also called Q-table, in which each possible state is associated with a row and each possible action is associated with a column. In the Q-table, the value of each cell represents the value of the state-action value function for the associated state-action pairing. The elements of a Q-table can be initiated with arbitrary values and then optimized by using a given reinforcement machine learning algorithm.

Advantageously, the optimization of an action-state value function represented by a Q-table can be performed by using a reinforcement learning algorithm of "Q-learning" type. In this case, the definition of the action-state value function can be updated after each step of a fictitious flight (episode) of the autonomous aircraft 100 according to the following relationship:

$$Q[s, a] = (1 - \alpha)Q[s, a] + \alpha\left(r + \gamma \max_a Q[s', a]\right) \quad (1)$$

in which s and s' respectively represent the new state and the current state, a represents the action executed, r represents the reward received, a is a learning factor lying between 0 and 1, and γ is an updating factor. The relationship (1) therefore makes it possible to replace the value of a cell of the Q-table with another value as a function of the reward received.

Moreover, the choice of the action to be executed a can be performed according to an approach specified by the strategy Q[s, a]. Such an approach can for example be of the ε-greedy type (ε ∈ [0, 1]) according to which the autonomous aircraft 100 randomly draws a number lying between 0 and 1. If this number is less than the coefficient ε, the aircraft will explore its environment 200 by choosing an arbitrary action; otherwise, it will use the information of the action-state value function. Advantageously, the value of ε can be constant for all the steps of an episode and can decrease in passing from one episode to another episode. For example, the update of the action-state value function in relation to the first fictitious flight of the autonomous aircraft 100 can be performed with a coefficient ε equal to 1. This corresponds to an exploration phase during which the autonomous aircraft 100 chooses random actions as it does not know its environment 200. Moreover, when the value of the coefficient c is close to zero, for example substantially equal to 0.05, the autonomous aircraft 100 can use the action-state value function as updated to choose the optimum action having the maximum potential gain. This corresponds to an operating phase during which the autonomous aircraft 100 uses the knowledge concerning its environment 200.

Alternatively, the optimization of an action-state value function represented by a Q-table can be performed by using a reinforcement learning algorithm of "double Q-learning" type. Such a variant of the "Q-learning" algorithm makes it possible to speed up the convergence of the strategy by implementing two action-state value functions, the updating of which is performed in a crossed manner according to the following two relationships:

$$Q^A[s, a] = Q^A[s, a] + \alpha\left(r + \gamma Q^B\left[s', \operatorname*{argmax}_a Q^A[s', a]\right] - Q^A[s, a]\right) \quad (2)$$

$$Q^B[s, a] = Q^B[s, a] + \alpha\left(r + \gamma Q^A\left[s', \operatorname*{argmax}_a Q^B[s', a]\right] - Q^B[s, a]\right) \quad (3)$$

Figure 5:
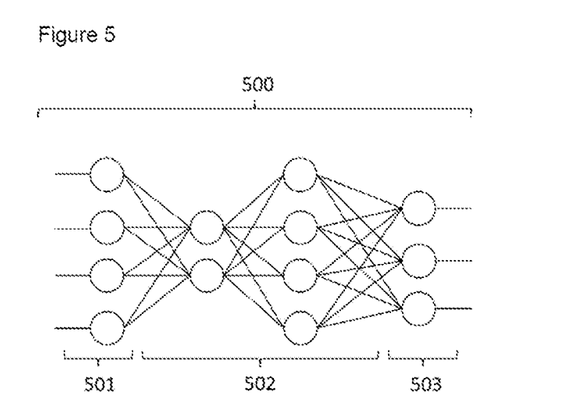
FIG. 5 represents a neural network according to an embodiment of the invention.

In other embodiments of the invention, the number of states in which the autonomous aircraft 100 can be can be very high, even infinite. Indeed, each possible combination of input information supplied by the sensors with which the autonomous aircraft 100 is equipped defines a different current state. It is therefore clear that a representation of the action-state value function according to a matrix format as described above can be complex in terms of computational power and in terms of memory resources. Advantageously, the action-state value function can be represented, approximately, by a deep neural network 500 in order to respond to the issue of the large size of the space of the states of the autonomous aircraft 100. In this case, the neural network 500 can be formed by several layers each comprising one or more neurons in which each neuron of a given layer is connected to all the neurons of the preceding layer and to all the neurons of the next layer, as illustrated in FIG. 5, the connection between two neurons being associated with a given weight. The neural network 500 comprises an input layer 501 comprising several neurons in which each neuron receives a piece of input information, also called input parameter. The input information can be directly supplied by a sensor with which the autonomous aircraft 100 is equipped or calculated based on information supplied by one or more sensors and/or supplied by the storage unit with which the autonomous aircraft 100 is equipped. The neural network 500 can comprise several intermediate layers 502, each of them being formed by one or more neurons. The neural network 500 further comprises an output layer 503 comprising several neurons in which each neuron corresponds to a possible action that the autonomous aircraft 100 can undertake. The number of possible actions can advantageously depend on the guidance law implemented.

Moreover, the optimization of an action-state value function represented by a neural network 500 amounts to optimizing the parameters of the neural network 500, that is to say the weights of the neural network 500, by using several fictitious flights of the autonomous aircraft 100.

Advantageously, the optimization of an action-state value function represented by a neural network 500 can be performed by using a reinforcement machine learning algorithm of "deep Q-learning" type. According to such a machine learning algorithm, the parameters of the neural network 500, represented by a vector denoted θ, are initialized with random weights before being updated after each step of a fictitious flight by stochastic gradient descent by using the following cost function:

$$L[\theta] = \left[Q[s, a; \theta] - \left(r + \gamma \max_a Q[s', a; \theta]\right)\right]^2 \quad (4)$$

in which Q[s, a; θ] represents the value of Q[s, a] estimated with the neural network 500 and $$\left(r + \gamma \max_a Q[s', a; \theta]\right)$$

represents the targeted value. In the relationship (4), one and the same neural network 500 is used to select the action and to calculate the targeted value.

Alternatively, the optimization of an action-state value function represented by a neural network 500 can be performed by using a reinforcement machine learning algorithm of "double deep Q-learning" type. Such a variant of the "deep Q-learning" algorithm offers the advantage of separating the selection of the action which maximizes the value of the function Q[s, a] from its evaluation by using two distinct neural networks:
- a first neural network 500 for the selection of the action to be executed, denoted network "Q";
- a second neural network 500 for the evaluation of the action executed, denoted network "Q-target".

Figure 6:
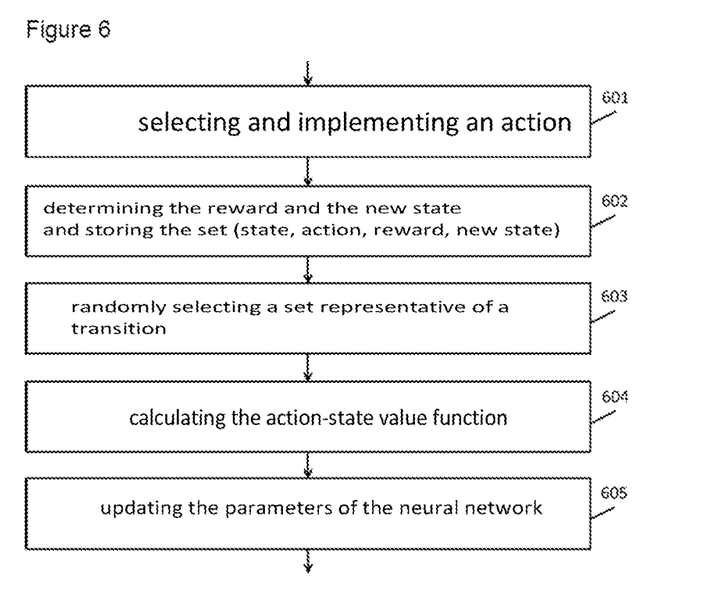
FIG. 6 represents steps of a method for optimizing a neural network, according to an embodiment of the invention.

FIG. 6 represents the steps implemented in the optimization of an action-state value function represented by a neural network 500 by using a reinforcement machine learning algorithm of "double deep Q-learning" type, according to an embodiment of the invention. Such steps are described in relation to a step of a fictitious flight of the autonomous aircraft 100 and are implemented recursively after an initiation step, each iteration being associated with a step of a fictitious flight of the autonomous aircraft 100.

The initialization step (not represented in FIG. 6) consists in initializing a repeat memory whose capacity is previously defined. The initialization step further consists in initializing the parameters of the two neural networks, network "Q" and network "Q-target", with random weights, $\theta_{INI}^Q$ for the network "Q" and $\theta_{INI}^{Q\text{-cible}}$ for the network "Q-target".

Advantageously, an observation step (not represented in FIG. 6) can be implemented at the start of each new episode before the implementation of the first iteration of the steps 601 to 605 relating to the first step of the new episode. The observation step consists in observing the initial state of the autonomous aircraft 100.

In the step 601, the autonomous aircraft 100 can select and implement an action according to a given approach which can be of ε-greedy type as described above.

In the step 602, the autonomous aircraft 100 can determine the reward and the new state based on the information supplied by the sensors and/or by the storage unit with which the autonomous aircraft 100 is equipped. The step 602 can further consist in storing, in the repeat memory, the transition represented by a set formed by the current state, the action executed, the reward received and the new state.

In the step 603, the autonomous aircraft 100 can randomly select a set representative of a transition from the sets stored in the repeat memory.

In the step 604, the autonomous aircraft 100 can calculate the action-state value function Q[s, a; $\theta_{ACTUEL}^Q$] by using the neural network 500 "Q". Furthermore, the autonomous aircraft 100 can calculate $$\left(r + \gamma \max_a Q[s', a; \theta_{ACTUEL}^{Q\text{-cible}}]\right)$$

by using the neural network 500 "Q-target".

In the step 605, the autonomous aircraft 100 can update the parameters of the neural network 500 by stochastic gradient descent by using the following cost function:

$$L[\theta] = \left[Q[s, a; \theta_{ACTUEL}^Q] - \left(r + \gamma \max_a Q[s', a; \theta_{ACTUEL}^{Q\text{-cible}}]\right)\right]^2 \quad (5)$$

Advantageously, a cloning step (not represented in FIG. 6) can be implemented regularly, for example after the end of a given episode. The cloning step can consist in using the parameters of the neural network 500 "Q" to update the parameters of the neural network 500 "Q-target".

Generally, any reinforcement machine learning algorithm can be used to optimize the action-state value function implemented in the guidance device 106, the value function being able to be represented by a Q-table or advantageously represented by a neural network 500. Examples of reinforcement machine learning algorithms include, by way of nonlimiting example, the "Monte Carlo" method, the "temporal-difference learning" algorithm or the "exhaustive search" algorithm.

In one embodiment of the invention, a complexity parameter can be associated with each fictitious flight of the autonomous aircraft 100, the fictitious flight being performed in a fictitious environment 200. The complexity parameter can for example represent the number of turns in the safe corridor 30 associated with the fictitious environment 200. Advantageously, the selection of the fictitious environments 200 used in the learning phase can be done in an ascending order of the complexity parameters, that is to say by beginning with the environments 200 that have low complexity parameters.

In another nonlimiting exemplary embodiment, the learning phase can be initiated by a fictitious flight associated with a complexity parameter defined on the basis of one or more turns present in the safe corridor 30 and/or one or more objects of interest 40. The learning phase can then be continued progressively by increasing in complexity (in ascending order of complexity parameters associated with the fictitious flights), by adding other turns, in the safe corridor 30, other objects of interest 40, and, generally, other elements defining a guidance constraint for the aircraft in the safe corridor 30.

In another embodiment of the invention, the strategy can directly be represented by a function determining, for each current state, an optimum action to be executed. Such a function can for example be represented by a neural network 500 as described above. Advantageously, the neural network 500 can in this case be optimized by using a reinforcement machine learning algorithm of "proximal policy optimization" type. Advantageously, the neural network 500 can in this case be a network of recurrent neurons 500.

Figure 7:
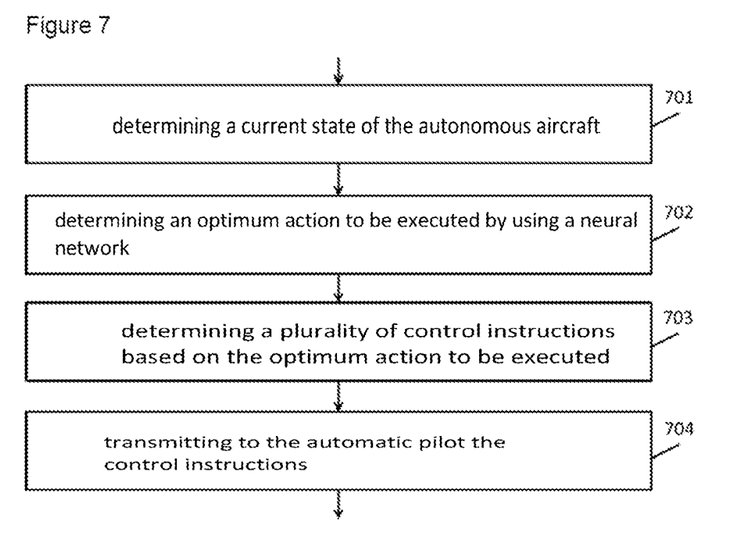
FIG. 7 represents steps of a method for guiding an autonomous aircraft, according to an embodiment of the invention.

FIG. 7 represents steps of a method for guiding an autonomous aircraft 100 according to an embodiment of the invention. Such steps are implemented by the guidance device 106 of an autonomous aircraft 100 implementing a neural network 500 determined and optimized during a preliminary learning phase according to one of the embodiments of the invention described above. The steps of FIG. 7 are implemented at a given instant of the flight of the autonomous aircraft 100.

In the step 701, the guidance device 106 can determine the current state of the autonomous aircraft 100 from the information supplied by the sensors with which the autonomous aircraft 100 is equipped and/or by its storage unit. Such a current state can for example comprise the position, the speed and the attitude of the autonomous aircraft 100, the relative position of an object of interest 40 to be photographed, the distances separating the autonomous aircraft 100 from the detected obstacles, etc.

In the step 702, the guidance device 106 can determine an optimum action to be executed by using the neural network 500 previously determined and optimized. The neural network 500 uses as input the current state of the autonomous aircraft 100 as determined in the step 701 and supplies an optimum action that the autonomous aircraft 100 can undertake.

In the step 703, the guidance device 106 can determine several control instructions intended for the automatic pilot 102 with which the autonomous aircraft 100 is equipped based on the optimum action obtained in the step 702. Thus, the optimum action is transformed into a plurality of control instructions. The step 703 can be performed according to the guidance law implemented in the automatic pilot 102.

In the step 704, the guidance device 106 can transmit to the automatic pilot 102 the control instructions in order to modify the behavior of the autonomous aircraft 100 in terms of speed and/or in terms of attitude, which provides a new state of the autonomous aircraft 100.

In embodiments of the invention, the steps 702 and 703 can be combined into a single step so that the neural network 500 determines, from the current state received, the control instructions intended for the automatic pilot 102 with which the autonomous aircraft 100 is equipped.

Advantageously, the guidance method can further comprise an additional step (not represented in FIG. 7) consisting in transmitting to the imaging unit 101 a photographic exposure instruction if the new state of the autonomous aircraft 100 makes it possible to photograph one or more objects of interest 40.

In an embodiment of the invention, the autonomous aircraft 100 is fixed-wing autonomous aircraft 100 type and the guidance law implemented to modify the behavior of the autonomous aircraft 100 can be chosen from among the following laws:
  a heading capture and holding law, by action on control surfaces of the ailerons of the autonomous aircraft 100;
  a route capture and holding law by action on control surfaces of the ailerons of the autonomous aircraft 100;
  an altitude capture and holding law by action on the thrust of the engine or on elevators of the autonomous aircraft 100;
  a speed capture and holding law by action on the thrust of the engine of the autonomous aircraft 100.

Figure 8:
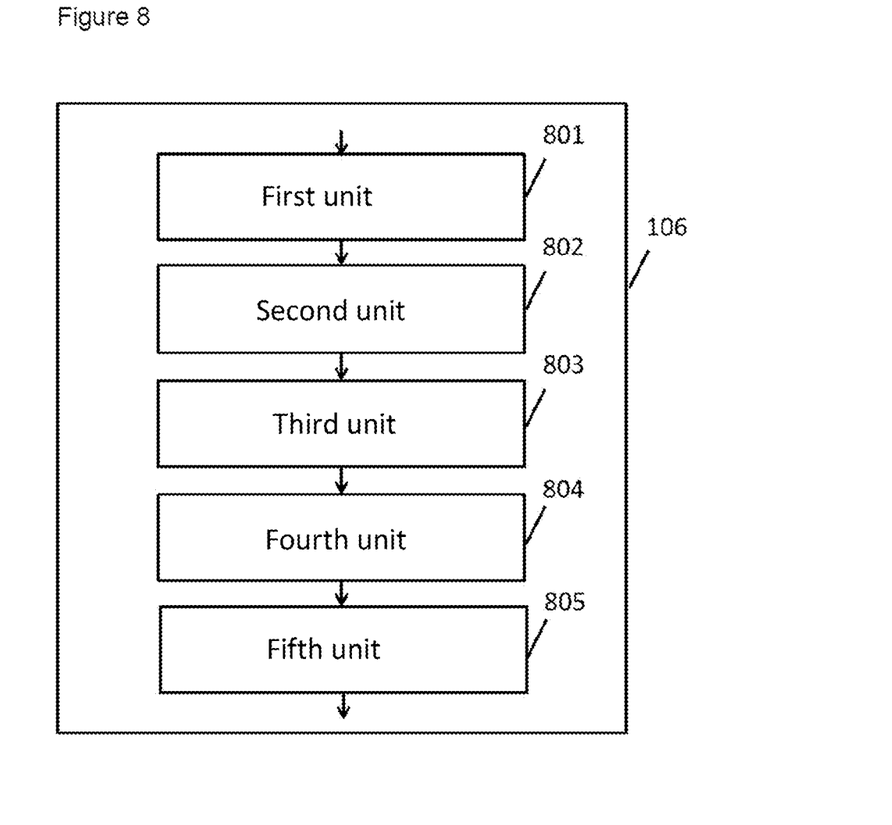
FIG. 8 represents an example of architectures of a guidance device implementing a guidance method, according to an embodiment of the invention.

FIG. 8 represents the architecture of a guidance device 106 implemented in an autonomous aircraft 100 according to an embodiment of the invention. The guidance device 106 can comprise:
  a first unit 801 capable of determining the current state of the autonomous aircraft 100 based on the information supplied by the sensors used and/or on the information supplied by the storage unit with which the autonomous aircraft 100 is equipped;
  a second unit 802 capable of determining an optimum action to be executed by using a neural network 500 previously determined and optimized;
  a third unit 803 capable of determining several control instructions intended for the automatic pilot 102 based on the optimum action to be executed;
  a fourth unit 804 capable of transmitting to the automatic pilot 102 the control instructions in order to modify the behavior of the autonomous aircraft 100.

The guidance device 106 is advantageously configured to implement a preliminary learning phase to optimize the neural network 500 based on a plurality of fictitious flights of the aircraft, each of the fictitious flights comprising a succession of fictitious steps.

The guidance device 106 can further comprise a fifth unit 805 capable of transmitting to the imaging unit 101 the photographic exposure instructions.

The embodiments of the invention can advantageously be adapted to an autonomous aircraft 100 of fixed-wing drone type equipped with an imaging unit 101 with opto-geometric parameters set over time. This makes it possible to increase the duration of the flight and to cover more extensive geographic zones than the solutions of the state of the art.

The person skilled in the art understands that the guidance method according to the embodiments can be implemented in various ways by hardware, software, or a combination of hardware and software, notably in the form of program code that can be distributed in the form of a program product, in various forms. In particular, the program code can be distributed using computer-readable media, which can include computer-readable storage media and communication media. The methods described in the present description can notably be implemented in the form of computer program instructions that can be executed by one or more processors in a computer computing device. These computer program instructions can also be stored in a computer-readable medium.

The invention is not limited to the embodiments described above by way of nonlimiting example. It encompasses all the variant embodiments that will be able to be envisaged by the person skilled in the art.

The invention claimed is:

1. A method for guiding an autonomous aircraft, the aircraft comprising an automatic pilot, a plurality of sensors and an imaging unit, the aircraft being configured to fly over a geographic zone comprising overflight prohibited zones and a safe corridor that does not pass through said overflight prohibited zones, said imaging unit being able to photograph one or more objects of interest located in said geographic zone, wherein the guidance method comprises a phase of real flight of the autonomous aircraft between a position of departure and a predefined position of arrival that are associated with said safe corridor, by using a given guidance law, the guidance method comprising the following steps, implemented at a given instant of said real flight phase:

determining a current state of said autonomous aircraft as a function of a plurality of input parameters comprising input parameters supplied by said plurality of sensors;

determining an optimum action to be executed by using a neural network receiving said current state;

determining a plurality of control instructions compatible with said guidance law based on said optimum action to be executed;

transmitting to said automatic pilot said plurality of control instructions, which provides a new state of said autonomous aircraft;

and in that the method comprises a preliminary learning phase consisting in optimizing said neutral network based on a plurality of fictitious flights of said aircraft, each of said fictitious flights comprising a succession of fictitious steps, and wherein said neural network represents a value function or a strategy associating with each current state of said autonomous aircraft at least one action, one of said at least one action being said optimum action to be executed.

2. The guidance method as claimed in claim 1, comprising an additional step consisting in transmitting to said imaging unit photographic exposure instructions, if said new state makes it possible to photograph at least one object of interest.

3. The guidance method as claimed in claim 1, wherein each of said actions from said value function being associated with an action value representative of an expected sum of reward parameters, said optimum action to be executed being associated with a maximum action value.

4. The method as claimed in claim 3, wherein the optimization of said neutral network based on said plurality of fictitious flights is determined by using a reinforcement machine learning algorithm.

5. The method as claimed in claim 3, wherein said reward parameters are maximal if the new state corresponds to:
- a state indicating that the autonomous aircraft remains in the safe corridor;
- a state indicating that the imaging unit photographs at least one object of interest;
- a state wherein the autonomous aircraft reaches a predefined position of arrival, and in that said reward parameters are maximal if the new state corresponds to a state indicating an exit of the autonomous aircraft from the safe corridor.

6. The method as claimed in claim 1, wherein said neural network comprises an input layer formed by a plurality of input neurons, at least one of said input neurons receiving information supplied by one of said sensors.

7. The method as claimed in claim 1, wherein each of said fictitious flights is associated with a complexity parameter, said fictitious flights being used in said preliminary learning phase according to an ascending order of said complexity parameters.

8. The method as claimed in claim 1, wherein said guidance law is a law from among:
- a heading capture and holding law by action on the control surfaces of the ailerons of the autonomous aircraft;
- a route capture and holding law by action on the control surfaces of the ailerons of the autonomous aircraft;
- an altitude capture and holding law by action on the thrust of the engine or on the elevators of the autonomous aircraft;
- a speed capture and holding law by action on the thrust of the engine of the autonomous aircraft.

9. A guidance device implemented in an autonomous aircraft, the aircraft comprising an automatic pilot, a plurality of sensors and an imaging unit, the aircraft being configured to fly over a geographic zone comprising overflight prohibited zones and a safe corridor that does not pass through said overflight prohibited zones, said imaging unit being able to photograph one or more objects of interest located in said geographic zone, wherein the guidance device comprises:
- a first unit capable of determining a current state of said autonomous aircraft as a function of a plurality of input parameters comprising input parameters supplied by said plurality of sensors;
- a second unit capable of determining an optimum action to be executed by using a neural network receiving said current state;
- a third unit capable of determining a plurality of control instructions compatible with said guidance law based on said optimum action to be executed;
- a fourth unit capable of transmitting to said automatic pilot said plurality of control instructions, which provides a new state of said autonomous aircraft, the guidance device being configured to implement a preliminary learning phase to optimize said neural network based on a plurality of fictitious flights of said aircraft, each of said fictitious flights comprising a succession of fictitious steps, wherein said neural network represents a value function or a strategy associating with each current state of said autonomous aircraft at least one action, one of said at least one action being said optimum action to be executed.

10. The guidance device as claimed in claim 9, comprising a fifth unit capable of transmitting to the imaging unit photographic exposure instructions.

11. An autonomous aircraft, comprising a guidance device configured as claimed in claim 9.

* * * * *